United States Patent [19]
Shimizu et al.

[11] Patent Number: 5,113,302
[45] Date of Patent: May 12, 1992

[54] MAGNETIC RECORDING MEDIUM HAVING A COUPLING AGENT DISPOSED BETWEEN A PROTECTIVE LAYER AND A LUBRICATING LAYER

[75] Inventors: Tomoyasu Shimizu; Yuichi Aoki, both of Tsukuba; Shinya Kawakita, Yotsukaichi, all of Japan

[73] Assignee: Nippon Sheet Glass Co., Ltd., Osaka, Japan

[21] Appl. No.: 438,140

[22] Filed: Nov. 20, 1989

[51] Int. Cl.$^5$ ............................ G11B 5/82; G11B 5/70
[52] U.S. Cl. .................................... 360/135; 428/694; 428/900; 360/131
[58] Field of Search ................ 360/135, 131; 428/694, 428/900

[56] References Cited

U.S. PATENT DOCUMENTS

| | | | |
|---|---|---|---|
| 4,069,360 | 1/1978 | Yanagisawa et al. | 360/135 |
| 4,444,850 | 4/1984 | Matsufuji et al. | 428/694 |
| 4,529,659 | 7/1985 | Hoshino et al. | 360/134 |
| 4,889,767 | 12/1989 | Yokoyama et al. | 428/336 |
| 4,895,763 | 1/1990 | Aoyama et al. | 428/405 |
| 4,910,068 | 3/1990 | Takagi et al. | 428/141 |

OTHER PUBLICATIONS

"Lubrication Layer Using Aminosilane Coupling Reagent for Rigid Disk Media", Hoshino et al., Nov. 1987.

*Primary Examiner*—Aristotelis Psitos
*Assistant Examiner*—Jefferson Evans
*Attorney, Agent, or Firm*—Armstrong, Nikaido, Marmelstein, Kubovcik & Murray

[57] ABSTRACT

A magnetic recording medium having a durability improving, carbon protective film formed on a surface of a magnetic recording layer, which is in turn disposed on a substrate, and a lubricant coated on a surface of the carbon film remote from the substrate; wherein a coupling agent layer is disposed between the carbon protective film and the lubricant, so that the force of adhesion of the lubricant to the carbon film is greatly improved, thus producing a magnetic recording medium having excellent lubricity and wear resistance.

6 Claims, 2 Drawing Sheets

FIG. I
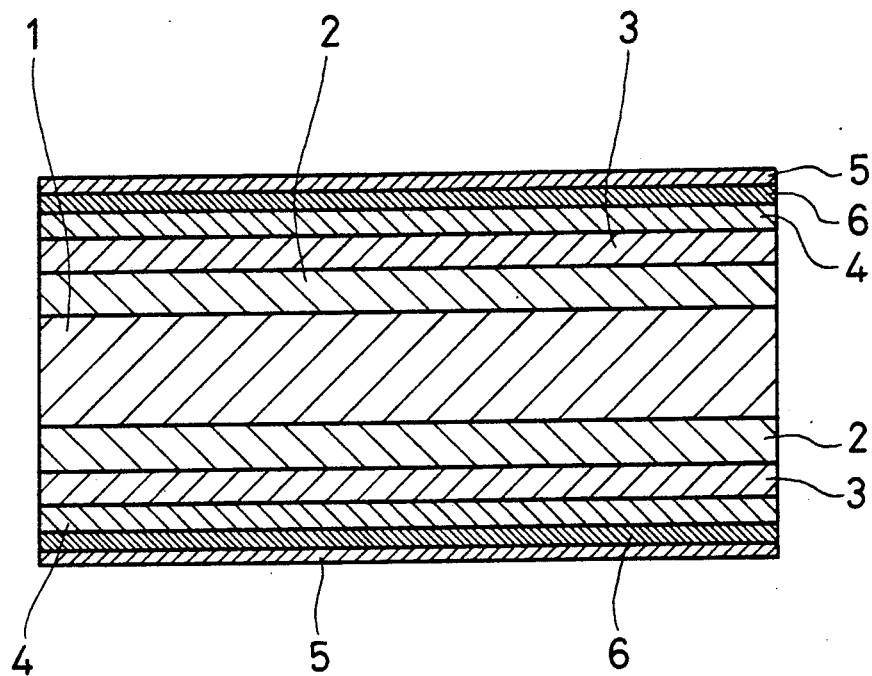
FIG. 3 PRIOR ART
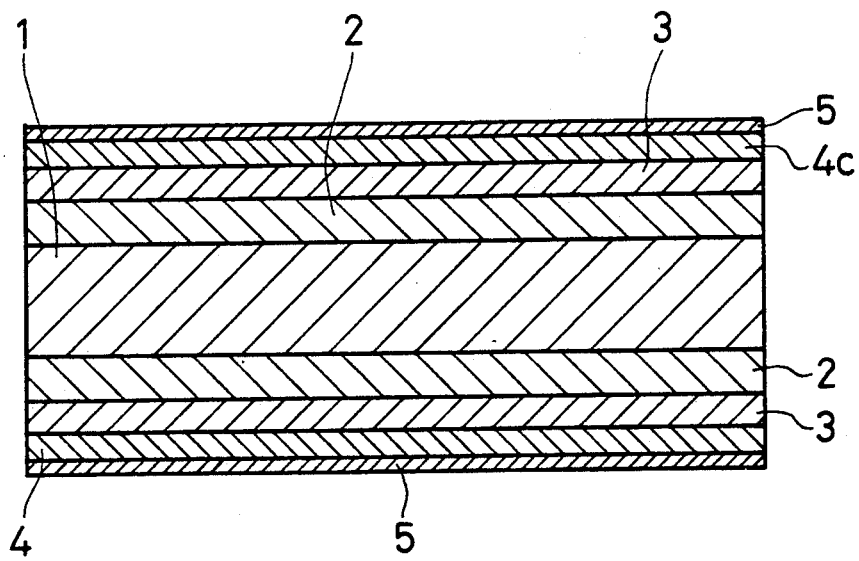

MAGNETIC RECORDING MEDIUM HAVING A COUPLING AGENT DISPOSED BETWEEN A PROTECTIVE LAYER AND A LUBRICATING LAYER

BACKGROUND OF THE INVENTION

1. Field of the Invention

The present invention relates to a magnetic recording medium used for a magnetic recording apparatus such as a magnetic disk apparatus and, more particularly, to an improvement in durability of the medium.

2. Description of the Prior Art

In a magnetic recording medium such as a hard magnetic disk for performing high-density recording, a metal magnetic thin film medium formed by, e.g., plating, sputtering, evaporation, has been used in place of a conventional coating type medium using a coating type magnetic film containing a magnetic powder and a binder.

When a recording/reproduction operation is performed with respect to a hard magnetic disk, in general, a CSS (contact start stop) system is used. In the CSS system, the disk is rotated at a predetermined speed, so that a very small air layer is formed between a magnetic head and the magnetic disk, and a recording/reproduction operation is performed in this state.

In the CSS system, the head is physically in contact with a surface of the magnetic disk in a stop mode. At the start and end of rotation, the head and the magnetic disk move relative to each other in a contact and friction state. The head and the magnetic disk surface are worn by friction at this time. When the head is brought into contact with the magnetic disk surface at high speed during a recording/reproduction operation, and large friction occurs between the head and the magnetic disk surface due to the presence of very small dust particles, the head or the magnetic film is often damaged.

In particular, in the metal magnetic thin film medium, since the coefficient of friction of the metal magnetic film is high, and the thickness of the film is small, the above problem is conspicuous. Therefore, in order to achieve corrosion resistance and lubricity of an upper portion of the metal magnetic film, a carbon protective film has been conventionally formed thereon. In addition, as shown in FIG. 3, a magnetic recording medium in which a liquid lubricant is coated on an upper portion of the carbon protective film has been used (e.g., Japanese Patent Laid-Open No. 61-208620).

An attempt has also been made to increase the coupling force between the lubricant and the carbon film using a liquid lubricant having a functional group (e.g., Japanese Patent Laid-Open No. 62-66417).

In the conventional magnetic recording medium shown in FIG. 3, however, the carbon film is insufficiently coupled to the lubricant. Therefore, when CSS is repeated, the effect of the lubricant is gradually reduced, and the friction force is increased. As a result, sufficient wear resistance and damage resistance cannot be obtained.

In addition, when the lubricant having the functional group is coated on the carbon film, it is strongly coupled to the lubricant. At the same time, the coupling force within the lubricant oil is increased. Therefore, the running property of the head is undesirably degraded.

SUMMARY OF THE INVENTION

The present invention has been made to solve the above problems, and has as its object to provide a magnetic recording medium, having excellent lubricity and wear resistance, in which a coupling agent layer is formed between a carbon protective film and a lubricant on a metal magnetic substance to greatly improve the adhesion force of the lubricant to the carbon film.

According to the present invention, there is provided a magnetic recording medium in which a carbon protective film is formed on a surface of a magnetic recording layer formed on a substrate to improve durability, and a lubricant is coated on an uppermost surface of the carbon film, wherein a coupling agent layer is formed between the carbon protective film layer and the lubricant.

The above and other objects, features, and advantages of the present invention will be readily understood by the following detailed description in conjunction with the accompanying drawings.

BRIEF DESCRIPTION OF THE DRAWINGS

FIG. 1 is a sectional view of a magnetic recording medium according to the present invention;

FIG. 3 is a sectional view of a conventional magnetic recording medium.

DETAILED DESCRIPTION OF THE PREFERRED EMBODIMENT

Figure 2:
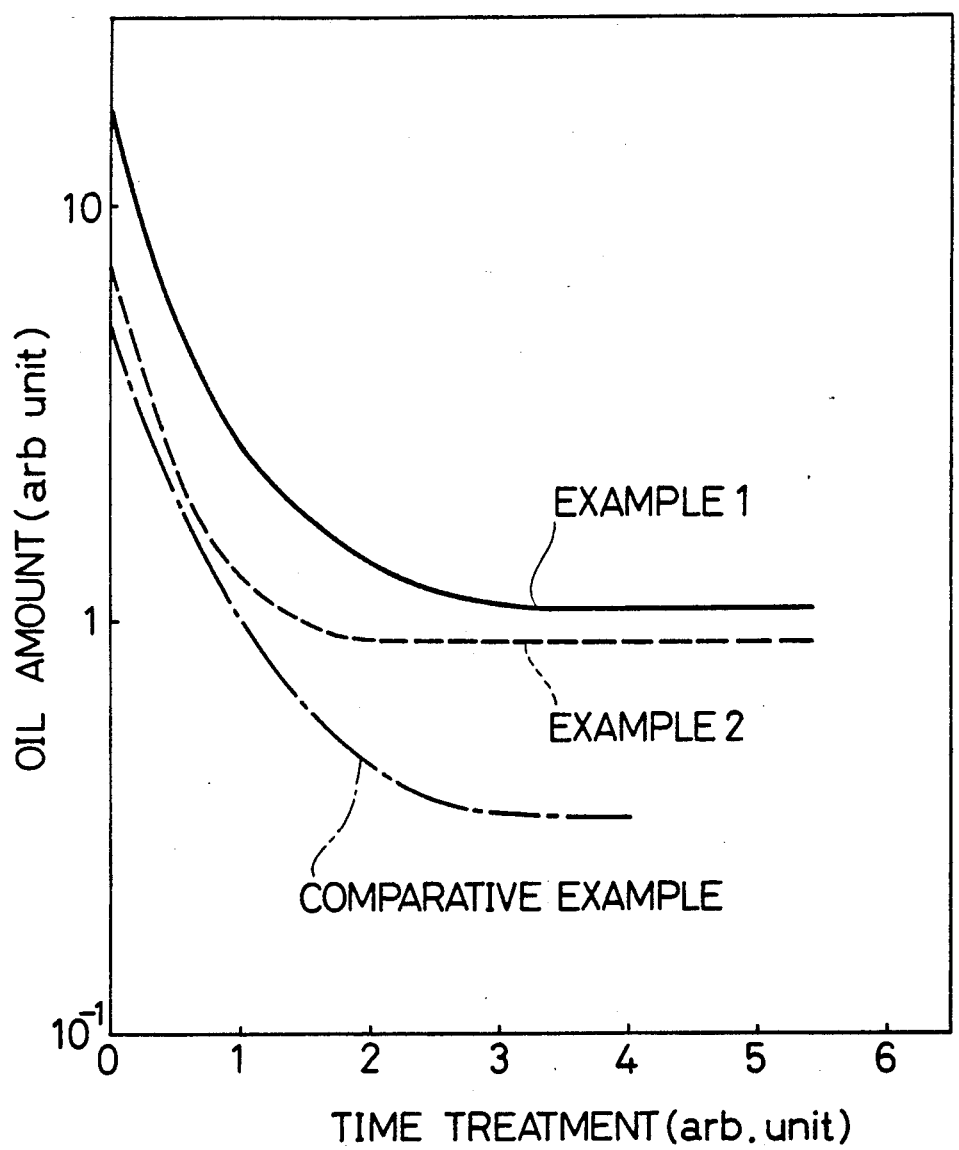
FIG. 2 is a graph showing a residual amount of a lubricant after a disk on which the lubricant is coated is cleaned by a solvent.

A coupling agent is a general term of a group of substances associated with an interaction at an interface between inorganic and organic substances. For example, a silane-, titanate-, aluminum-, or zirconium aluminate-based coupling agent is mainly used.

All the above substances are organometallic compounds or metallic complexes, and are compounds each having both of a portion which is easily coupled to an inorganic substance and a portion which is easily coupled to an organic substance in one molecule.

The portion which is easily coupled to an inorganic substance has a structure wherein an alkoxyl group is coupled to a metal atom. In this portion, an alkyl group substitutes a metal or carbon atom on a surface of the inorganic substance to be coupled to the inorganic substance surface.

The portion which is easily coupled to an organic substance has a structure wherein a long-chain alkyl or polymethylene group has a functional group at its terminal end. The coupling is achieved by compatibility or reaction between this portion and the organic substance.

An aluminum- or titanate-based coupling agent is preferably used for a surface of the carbon protective film. In particular, e.g., acetoalkoxyaluminumdiisopropylate ("AL-M" available from Ajinomoto Co., Inc.) as an aluminum-based coupling agent, or isopropyltri(N-aminoethyl-aminoethyl) titanate ("KR44" available from Ajinomoto Co., Inc.) as a titanate-based coupling agent exhibits excellent properties.

For example, the coupling agent and lubricant are formed such that, after a magnetic recording medium having a carbon protective film is dipped into a coupling agent solution diluted by a solvent and is pulled up, a non-coupled portion of the coupling agent is removed, and a lubricant diluted by a solvent is coated by, e.g., dipping in the same manner as in the case of the coupling agent.

Fluorocarbon such as perfluoroalkylpolyether is preferably used as the lubricant. In particular, a lubricant having a structure with a benzene ring at its terminal end, and no polar or reaction group (e.g., "Fomblin AM2001"; available from MONTEZISON Co., Italy) preferably exhibits a good running property of a head, a strong coupling force to a carbon protective film, and excellent lubricity and durability.

In the above-mentioned coating process, a thermal treatment is preferably performed at a temperature within the range of 60° C. to 200° C. after the coupling agent is coated. This is because an effect of an increase in adhesion force of the coupling agent to couple the lubricant to the disk is remarkably improved.

In order to simplify the process, a solution obtained by dissolving both the coupling agent and lubricant in a solvent in advance may be coated. Also in this case, an excellent effect can be obtained by a thermal treatment after coating.

The carbon protective film is normally formed on a substrate having a temperature within the range of room temperature to about 300° C. by vacuum evaporation or sputtering. Since the carbon film thus formed is chemically stable and has no polarity, in general, it is difficult to be strongly coupled to other substances. However, this film has an amorphous structure, and is assumed to include, on its surface, a large number of nonbonded terminals of non-electron pairs or a hydroxide group ( C—OH) obtained by a reaction between the nonbonded terminals and, e.g., the moisture in atmosphere.

When the coupling agent is coated on an upper portion of the carbon film having the nonbonded terminals or hydroxide group, chemical bonding occurs between the two substances. The surface of the carbon film is covered with molecules of the coupling agent, and the properties of the surface are changed, thus increasing a coupling force between the surface and the lubricant.

According to the present invention, the carbon protective film is strongly coupled to the coupling agent by chemical bond, and the lubricant coated on the coupling agent layer is strongly held by the coupling agent by: (1) physical entanglement between the lubricant and the organic substance groups of the coupling agent, or a van der Waals force increased by a decrease in distance between the molecules; and (2) realization of bonding between the lubricant and the organic substance in the coupling agent by a chemical reaction. As a result, the coupling agent functions to achieve a strong coupling force between the carbon protective film and the lubricant.

EMBODIMENT

Example 1

FIG. 1 is a sectional view showing a structure of a magnetic recording medium according to the present invention. Referring to FIG. 1, in the magnetic recording medium of this invention, a chromium (Cr) film serving as an undercoating layer 2 was formed on a chemically reinforced glass disk 1, and a cobalt-nickel-chromium (Co—Ni—Cr) alloy was formed on the undercoating layer 2 as a metal magnetic layer 3 to have a thickness of about 50 nm. In addition, a carbon film having a thickness of about 40 nm was formed on the metal magnetic layer 3 as a protective layer 4. In this case, the undercoating layer 2, the metal magnetic layer 3, and the protective layer 4 were formed on the glass substrate 1 by sputtering.

Acetoalkoxyaluminumdiisopropylate ("AL-M") was diluted by a solvent, i.e., trichlorotrifluoroethane to have a concentration of 0.01%. The resultant dilute solution was coated on the disk as a coupling agent by dipping.

Thereafter, this disk was left to stand at 110° C. for one hour, and a non-coupled portion of the coupling agent was removed by the solvent. Perfluoroalkylpolyether ("Fomblin AM2001") was diluted by a solvent, i.e., trichlorotrifluoroethane to have a concentration of 0.5%. The resultant dilute solution was coated on the disk as a lubricant by dipping, and the disk was left to stand at 110° C. for five minutes.

Note that a thermal treatment performed after the coupling agent and the lubricant are coated was performed to enhance the reactivity between the carbon protective film and the coupling agent, and the reactivity between the coupling agent and the lubricant.

When an adhesion force between the lubricant 5 and the carbon protective film 4 on the disk in this invention was examined, as shown in FIG. 2, the disk in this invention had an adhesion force twice or more that of a disk in which only a lubricant is coated on the carbon protective film. Note that the adhesion force was measured by measuring the residual amount of the lubricant after the disk was cleaned by the solvent.

In addition, when a test (to be referred to as a CSS test hereinafter) in which the disk was rotated at high speed, i.e., 3,600 rpm, and contact start and stop of the head is repeated was performed, a wear trace appeared on a disk surface after the test was repeated 2,000 times, in the disk without the coupling agent. However, in the disk according to the present invention, no abnormality appeared on the disk surface after the test was repeated 20,000 times.

EXAMPLE 2

A disk substrate was formed in the same manner as in Example 1, and a carbon protective film was coated o the substrate. Isopropyltri(N-aminoethyl-aminoethyl) titanate ("KR44") was diluted by a solvent, i.e., isopropyl alcohol to have a concentration of 0.01%. The resultant dilute solution was coated on the disk substrate as a coupling agent by dipping.

After this disk was left to stand at 110° C. for one hour, a non-coupled portion of the coupling agent was removed by the solvent, and the lubricant 5 which was the same as in Example 1 was coated on the disk following the same procedures as in Example 1. Thereafter, the disk was left to stand at 110° C. for five minutes. An adhesion force was measured in the same manner as in Example 1 (FIG. 2), and the CSS test was performed. The disk according to the present invention has an adhesion force twice or more that of a disk in which only a lubricant is coated on the carbon protective film. After the CSS test was repeated 20,000 times, no abnormality appeared on the disk surface.

EXAMPLE 3

The above-mentioned "AL-M" and "Fomblin AM2001" were diluted by trichlorotrifluoroethane to have concentrations of 0.01% and 0.1%, respectively. Equal amounts of these dilute solutions were mixed, and the mixed solution was coated on the disk substrate on which the carbon protective film was formed as a dipping solution, in the same manner as in Example 1. Thereafter, the resultant disk was left to stand at 110° C. for five minutes. When the disk subjected to the CSS test 20,000 times was observed, no abnormality was found on the surface.

Comparative Example 1

An adhesion force of a lubricant of a conventional magnetic recording carrier, in which the lubricant is coated on a carbon protective film formed in the same manner as in Example 1 without forming a coupling agent layer, was measured in the same manner as in Example 1. The result is shown in FIG. 2. The adhesion force of the lubricant was poorer than that in Example 1.

Thus, in the present invention, since the coupling agent layer is formed between the carbon protective film and the lubricant on the metal magnetic substance, an adhesion force of the lubricant is greatly improved, thus obtaining a magnetic recording medium having excellent lubricity and wear resistance.

Having described illustrative embodiments of the invention with reference to the accompanying drawings, it is to be understood that the invention is not limited to such precise embodiments, and that various changes and modifications may be effected therein by one skilled in the art without departing from the scope and spirit of the invention as defined in the appended claims.

What is claimed is:

1. In a magnetic recording medium comprising a substrate, a magnetic recording layer, a carbon protective film layer disposed on said recording layer, and a lubricant layer disposed on said carbon film layer; the improvement, whereby to improve the adhesion between said carbon layer and said lubricant layer, which comprises an acetoalkoxyaluminumdiisopropylate coupling agent disposed between said carbon film layer and said lubricant layer.

2. A medium according to claim 1, wherein said lubricant is a perfluoroalkylpolyether.

3. A process of forming a magnetic recording medium comprising: forming a magnetic recording layer on a substrate; forming a carbon film on said recording layer; applying acetoalkoxyaluminumdiisopropylate coupling agent to said carbon film layer; and coating a lubricant on said coupling layer.

4. A process as claimed in claim 3 including holding said coupling agent coated medium at an elevated temperature prior to coating said lubricant thereon.

5. A process as claimed in claim 4 including dissolving off uncoupled portions of said coupling agent after said elevated temperature holding period and before coating said lubricant thereon.

6. A process as claimed in claim 5 including holding said lubricant coated medium at an elevated temperature for a time and at a temperature sufficient to enhance the reactivity between said carbon film, said coupling agent and said lubricant.

* * * * *